Figure 5:
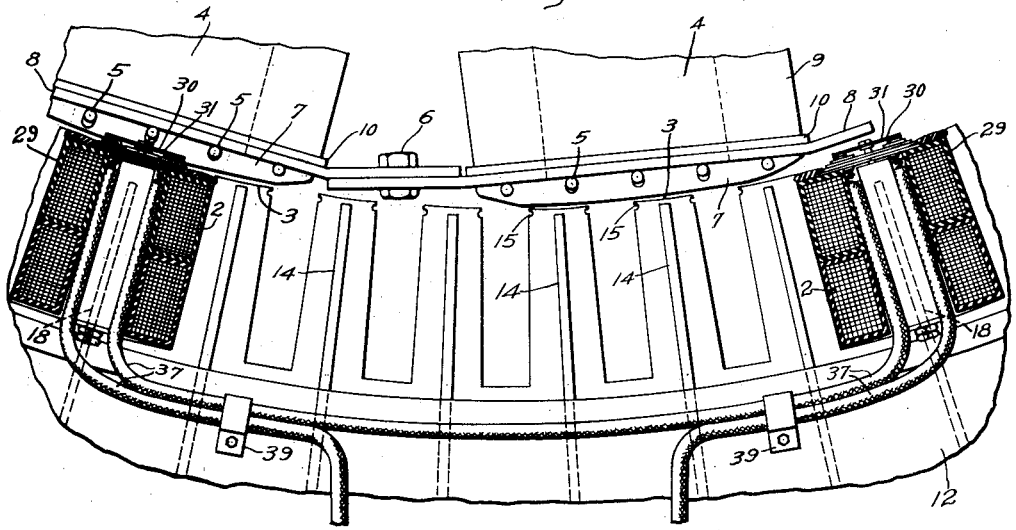

May 17, 1938.  C. C. SHUTT  2,117,915
DAMPER WINDING THERMAL PROTECTION
Filed July 11, 1936  2 Sheets-Sheet 1
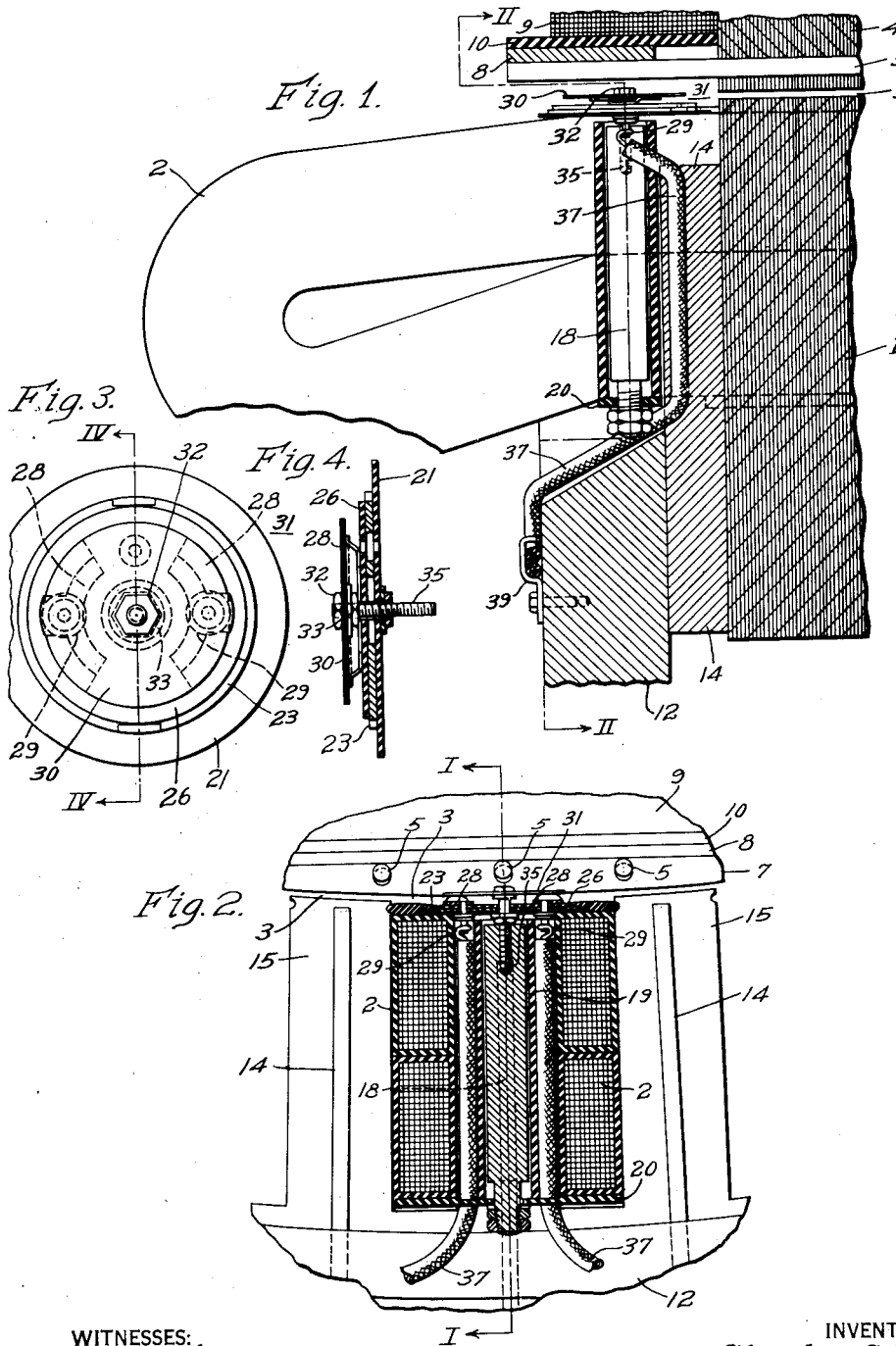
WITNESSES:
INVENTOR
Charles C. Shutt.
BY
ATTORNEY May 17, 1938.  C. C. SHUTT  2,117,915

DAMPER WINDING THERMAL PROTECTION

Filed July 11, 1936  2 Sheets-Sheet 2

WITNESSES:

INVENTOR
Charles C. Shutt.
BY
ATTORNEY

Patented May 17, 1938

2,117,915

UNITED STATES PATENT OFFICE 2,117,915

DAMPER WINDING THERMAL PROTECTION

Charles C. Shutt, East McKeesport, Pa., assignor to Westinghouse Electric & Manufacturing Company, East Pittsburgh, Pa., a corporation of Pennsylvania Application July 11, 1936, Serial No. 90,207

8 Claims. (Cl. 172—120)

This invention relates to protective devices for motors and particularly to the protection of a synchronous motor by means of a device responsive to current in the damper winding.

It is an object of this invention to protect the motor in proportion to the temperature of the damper winding.

It is a further object of this invention to provide protection against conditions which result in excessive slipping, and consequently excessive periods of operation on the damper winding, such, for example, as over-frequent starting and stopping of the motor as distinguished from ordinary overload.

Other objects of the invention and details of the proposed structure will be apparent from the following description and the accompanying drawings, in which:

Figure 1 is a section through a portion of the motor taken on a plane through the axis of rotation. It is essentially a section taken along the line I—I of Fig. 2, Fig. 2 is a section taken along the line II—II of Fig. 1, Fig. 3 is a detail plan view of the thermostat used, Fig. 4 is a section taken along the line IV—IV of Fig. 3, Fig. 5 is an end view of a portion of the machine, and Fig. 6 is a diagram of the circuits employed.

In Figure 1, a portion of the stator laminations is shown at 1 and a stator coil at 2. The air gap between the stator and the rotor is shown at 3 and a portion of the rotor laminations is shown at 4. The laminations of the rotor enclose the damper winding of which one bar shows at 5. The damper bars are shown in end view at 5 in Fig. 2. The double position illustrates the bending by which the bars 5 accommodate themselves to the shape of the pole pieces 7. An end ring 8 unites the bars 5 in the usual way to make a squirrel cage connection. The ring is formed by joining adjacent portions by bolts 6, as shown in Fig. 5. The ring 8 is separated from the field coil 9 by the insulation 10.

The laminations of the stator are held in place by end plates, one of which is shown at 12. The end plates are equipped with fingers 14 which extend along the surfaces of the end members of the laminations nearly to the apex of each tooth 15 of the stator.

Figure 6:
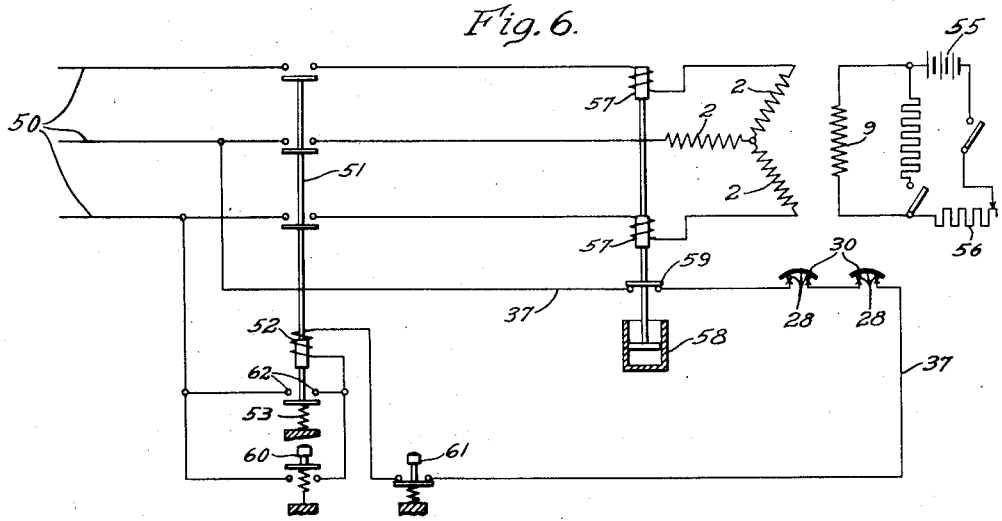

In Fig. 5 the stator windings have been omitted, except in the four slots at each side of the drawing where they are shown in section. The stator windings are also shown in section in Fig. 2. A brass core or rod 18 enclosed by insulating tube 19 is positioned between two adjacent stator windings or coils and is held in place by nuts screwed onto the lower end of the core and bearing against a plate of insulation 20 at the lower (Fig. 2) side of the stator coils.

A thin sheet of paper or mica 21 bearing against the opposite sides of the coils 2 is reinforced by a metal plate 23 which carries a sheet of mica or other insulation 26 upon which are mounted the contacts 28 of a thermostat 31. The shape of these contacts is best shown by their dotted-line representation in Fig. 3, and an edge elevation of one of them is plainly seen in Fig. 4. Connection terminals 29 extend from each contact 28 through the bottom insulation 21 being insulated in a well known manner from the metal 23.

Thermostat 31 comprises a bimetal disk 30 which bridges the contacts 28 when cold but when heated snaps into a configuration concave toward the plate 26 and separated from the contacts 28. A nut 32 peened in place and a washer 33 position the center of the disk 30. The whole thermostat 31 is secured in place and the positioning of the disk is adjusted by the screw 35 which enters the core 18. The contacts 28 are each secured to wires 37 which run between the coils 2 and the core 18. The leads of which the wires 37 are the ends are secured in place on the end plate 12 by brackets 39.

Two or more thermostats 31 are spaced circumferentially around the machine adjacent the air gap, as illustrated in Fig. 5. The circumferential distance between the two thermostats, if there are but two, is not an integral number of pole pitches, so that when one thermostat is directly beneath a pole piece the other is beneath the space between two poles. When there are more than two thermostats they are so spaced that all of them will not be beneath poles at once nor all beneath inter-pole space at once. Thus, wherever in its rotation the machine stops, if one thermostat is between two poles, another thermostat will be adjacent a pole.

The circuit illustrating the use of this device in Fig. 6, shows a power line 50 with a circuit breaker 51 of the type normally held closed by a magnet 52 and operated to open position by a spring 53 which continually exerts its bias. The power line supplies a motor which, as illustrated, has three stator windings 2 connected to the line 50. A rotor or field winding 9 is supplied from any desirable source of direct current which is illustrated by a battery 55 and a rheostat 56. The usual connections from the battery 55 through slip connections to the winding 9 are supplied and they include a starting resistor as well as the rheostat 56 and the interlocking switches for the starting. Overload relays are illustrated by two windings 57 in two of the main wires 50 and a restraining dashpot 58.

A circuit from one main wire 50 to a neighboring main is broken at 59 by the action of the relays 57 when sufficiently energized. This circuit includes the leads 37 shown in Figs. 1, 2 and 5 and includes the thermostat contacts 28 in series therewith. A motor-starting device 60 and a motor-stopping device 61 of a conventional (push-button) sort are also shown. The magnet winding 52 for the circuit-breaker 51 is in the circuit just described and is equipped with a self-holding circuit including a pair of locking contacts 62 which are thus closed upon the button 60 being pushed.

In the operation of the device, the motor may be started by pushing the button 60 which causes the magnet 52 to be energized and closes the circuit-breaker 51. This energizes the stator of the synchronous motor. The starting switches in connection with the field winding and the resistors may be manually or automatically operated. While the motor is being started as well as when running, the field winding carries some current and is heated to some extent but the heating of the damper winding, which is not shown in the diagram, Fig. 6, is more significant in connection with the invention. This is partly because the thermostats are better shielded from the field winding and partly because the current in the damper winding is high during starting, while it is usually very small at synchronous speed. It is also more necessary to protect the damper winding because it is more readily injured by overheating.

If the mechanical load be too heavy, the current drawn through the wires 59 will be strong and will cause the magnet 57 to open the contacts 59 against the action of the dashpot 58. Opening the circuit through the wires 37 deenergizes the magnet 52 and causes the spring 53 to operate the circuit-breaker 51 and stop the motor. If the overload is not sufficient for this, it may yet be sufficient to cause an undesirable amount of slipping and so heat the damper winding. Although the damper winding bars are in motion, some of them are always closely adjacent to the thermostat 31 and disk 30 is thus heated, causing it when a certain temperature is exceeded to snap away from the contacts 28. This opens the circuit through the leads 37 and deenergizes the winding 52, causing the motor to stop.

If the overload is not sufficient to cause much slipping but the motor is started and stopped repeatedly, the damper winding may become hot from the non-synchronous action of the motor during the starting and stopping. This also will heat the thermostat causing it to open the circuit 37 and stop the motor.

The thermal insulation of the mica sheet 21 helps to protect the thermostat against the heat of the stator coils 2. When properly designed and operated, these coils have very little effect on the thermostat but the temperature thereof is affected mostly by radiation from the bars 5 and the ring 8.

It may happen that the protection afforded by the overload relays 57 is sufficient to stop the motor even before the damper winding becomes much heated but whenever through any accident the slipping is large or the stopping and starting frequent, even though overload conditions do not pertain, the damper winding will become hot and the motor will be stopped, thus affording protection even under these unusual circumstances.

The location of the thermostats 31 results in at least one of them being heated whenever the damper winding is heated regardless of the temperature of the machine as a whole. The thermostats are farther from other windings and from the iron than they are from the bars as they pass the thermostat.

Although as supplied commercially there is a metal cover over the disk 30, this has been omitted when the thermostat is installed in the motor so that there is no obstacle to radiation from the bars 5 to the disk 30 as they go past it.

Many variations will occur to those skilled in the art and the specific illustration and description of details in this application are not to be regarded as a limitation. The only intentional limitations are those expressly stated in the claims.

I claim as my invention:

1. In a dynamo-electric machine, a stator, a rotor, a damper winding in the rotor, a thermostat mounted in the stator exposed to a flow of heat from said damper winding across the air gap between said stator and rotor, and a circuit-breaker controlled by said thermostat.

2. In a rotary machine, a rotor, a stator, coils on each of said parts, a damper winding on one of said parts, a thermostat mounted on the other part and exposed to a flow of heat from said damper winding across the air gap between said stator and rotor, and leads for said thermostat located between the coils on said other part.

3. In a rotary machine, a rotor, a stator, a damper winding on one of said parts, and a thermostat mounted on the other part and exposed to a flow of heat from said damper winding across the air gap between said stator and rotor.

4. In a rotary machine, a rotor, a stator, coils on each of said parts, a damper winding on one of said parts, a thermostat mounted on the other part and exposed to a flow of heat from said damper winding across the air gap between said stator and rotor, leads for said thermostat located between the coils on said other part, a protection device and a control circuit for the same, said thermostat controlling said circuit.

5. In a rotary machine, a rotor, a stator, a plurality of polar projections including damper windings on one of said parts, and a plurality of thermostats on the other part for receiving heat from said damper windings, said thermostats being spaced apart a distance other than the distance between said projections or a multiple thereof.

6. In a rotary machine, a stator, a rotor having a plurality of polar projections, damper windings thereon, and a plurality of thermostats mounted on the stator for receiving heat from said damper windings, said thermostats being circumferentially spaced apart non-integrally with relation to the polar projection pitch.

7. In a rotary machine, a stator, a rotor, a damper winding in the rotor, a stator winding having coils disposed in slots in the stator, a supporting member disposed between adjacent coils, and a thermostat secured to said supporting member for receiving heat from said damper winding.

8. In a rotary machine, a stator, a rotor, a damper winding in the rotor, a stator winding having coils disposed in slots in the stator, a non-magnetizable member mounted between adjacent coils, and a thermostat secured to the outer face of said member for receiving heat from said damper winding.

CHARLES C. SHUTT.